United States Patent [19]

Mueller et al.

[11] Patent Number: 4,940,634

[45] Date of Patent: Jul. 10, 1990

[54] HIGH BARRIER LOW PROFILE FORMING WEB

[75] Inventors: Walter B. Mueller, Inman; Henry G. Schirmer, Spartanburg, both of S.C.

[73] Assignee: W. R. Grace & Co.-Conn., Duncan, S.C.

[21] Appl. No.: 842,530

[22] Filed: Mar. 21, 1986

[51] Int. Cl.⁵ .................. B32B 1/02; B32B 31/12; B32B 31/30

[52] U.S. Cl. ...................... 428/349; 156/244.17; 156/272.6; 156/273.3; 428/36.7; 428/515; 428/516; 428/518; 428/520; 428/910

[58] Field of Search ............... 428/515, 516, 517, 518, 428/347, 349, 910, 520; 156/244.17, 272.6, 273.3

[56] References Cited

U.S. PATENT DOCUMENTS

| | | | |
|---|---|---|---|
| 3,508,944 | 4/1970 | Henderson et al. | 428/516 |
| 3,560,291 | 3/1971 | Foglia et al. | 428/515 |
| 3,595,740 | 7/1971 | Gerow | 161/254 |
| 3,773,609 | 11/1973 | Haruta et al. | 156/244.17 |
| 3,840,427 | 10/1974 | Brazier et al. | 156/244.17 |
| 3,932,693 | 1/1976 | Shaw et al. | 428/518 |
| 4,008,352 | 2/1977 | Dawes et al. | 428/518 |
| 4,254,175 | 3/1981 | Kubat et al. | 428/515 |
| 4,277,594 | 7/1981 | Matthews et al. | 526/352 |
| 4,318,763 | 3/1982 | Bieler et al. | 428/518 |
| 4,364,981 | 12/1982 | Horner et al. | 428/35 |
| 4,386,138 | 5/1983 | Arbit | 156/272.6 |
| 4,399,180 | 8/1983 | Briggs et al. | 428/212 |
| 4,425,268 | 1/1984 | Cooper | 524/110 |
| 4,457,960 | 7/1984 | Newsome | 428/520 |
| 4,484,971 | 11/1984 | Wang | 156/244.17 |
| 4,495,027 | 1/1985 | Wagner, Jr. et al. | 428/910 |
| 4,536,365 | 8/1985 | Zwick | 264/182 |
| 4,551,380 | 11/1985 | Schoenberg | 428/910 |
| 4,684,573 | 8/1987 | Mueller et al. | 428/515 |

FOREIGN PATENT DOCUMENTS

| | | | |
|---|---|---|---|
| 1381883 | 11/1964 | France | 156/244.17 |
| 7105059 | 11/1966 | Japan | 428/518 |
| 124648 | 7/1983 | Japan | 156/244.17 |
| 1416625 | 12/1975 | United Kingdom | 156/244.17 |

*Primary Examiner*—James C. Cannon
*Attorney, Agent, or Firm*—John J. Toney; William D. Lee, Jr.; Mark B. Quatt

[57] ABSTRACT

A forming web comprises a first extruded polymeric film oriented to substantially the same extent in both the longitudinal and machine directions. Alternately, a high molecular weight crystalline polyolefin is blown at least to a blow-up ratio sufficient to orient the film to substantially the same extent in both the longitudinal and machine directions. A second extruded polymeric film including a layer of an oxygen barrier polymeric material may be laminated to the first film.

17 Claims, 2 Drawing Sheets

HIGH BARRIER LOW PROFILE FORMING WEB

BACKGROUND OF THE INVENTION

This invention relates generally to high barrier laminates and more specifically to laminates useful in thermoforming operations.

Articles such as food items and more specifically meat products are often packaged in thermoplastic films or laminates in order to protect the product to be packaged from exterior abuse and environmental contamination, and to provide a convenient and durable package for distribution of the product and display in a display case or other point of sale. When dealing with meat products in particular, it is usually desirable to provide a film having good oxygen barrier characteristics, in order to reduce the infiltration of oxygen into the meat product with its detrimental effect on freshness, color, and other properties of the meat product.

Thermoforming methods such as vacuum forming or plug-assist vacuum forming are often useful in packaging meat products. In general terms, thermoforming involves heating of a thermoplastic film or laminate and forming the film or laminate into a desired shape for holding a meat product to be inserted. This formed sheet of a film or laminate is usually referred to as a forming web. Various systems and devices are used in a thermoforming process, often accompanied by vacuum-assist and plug-assist components to provide the proper forming of the forming web into a predetermined shape. Thermoforming systems are well known in the art.

Although many types of films and laminates have been utilized in thermoforming operations, including shallow draw operations in which the forming web takes on a shallow shape i.e. a relatively low profile form, it has been found that certain problems may arise during the thermoforming step. One such problem is known as "line draw".

This phenomenon may be described as an extreme thinning of thermoplastic crystalline material in a direction at 90° to the direction of orientation of the material. Lines of thinned, stretched material are observable, usually running parallel to the oriented direction of the film (usually the machine or longitudinal direction).

Line draw is an undesirable characteristic of a thermoplastic crystalline material which has been produced with either substantially no orientation, or orientation principally in one direction only, usually the machine direction. Upon subsequent thermoforming of the film, the film is stretched as it is shaped to the thermoformed mold configuration. In the unoriented direction, the material will elongate at the yield point, resulting in elongated tapered streaks aligned in the oriented direction.

This phenomenon results in reduced strength at the thermal areas, and a mottled appearance.

It has now been discovered that by orienting a film to substantially the same extent in both the longitudinal and transverse directions, at relatively low maximum orientation ratios, a film having good thermoforming properties with little or no line draw is obtained.

It has also been discovered that such balanced orientation, at relatively low orientation ratios, achieves a film especially useful in shallow draw thermoforming operations.

Of interest is U.S. Pat. No. 4,399,180 issued to Briggs et. al. and disclosing the use of a primary layer of linear low density polyethylene with at least one coextruded layer on one side thereof of a highly branched low density polyethylene, the laminates being useful in stretch wrapping around pallet loads and the like.

Also of interest is U.S. Pat. No 4,425,268 issued to Cooper and disclosing a stretch wrap film comprising about 40 to 90 percent by weight of ethylene vinyl acetate and about 8 to 55 percent by weight of a linear copolymer of ethylene and a higher alkene.

Also of interest is U.S. Pat. No. 4,364,981 issued to Horner et·al disclosing a blown coextruded tubular film of three layers, with a core layer of low pressure low density polyethylene and outer layers of high pressure low density polyethylene.

Of interest is U.S. Pat. No. 4,457,960 issued to Newsome and disclosing multi-layer structures including linear low density polyethylene in at least one layer, and blends of linear low density polyethylene with ethylene vinyl acetate copolymer. The multi-layer structures may be biaxially oriented.

It is an object of the present invention to provide a film or laminate suitable for use as a forming web in a thermoforming process.

It is a further object of the present invention to provide a film or laminate useful in thermoforming operations, yet avoiding the line draw problem.

SUMMARY OF THE INVENTION

A thermoplastic composite film useful in thermoforming operations comprises a first film oriented to substantially the same extent in both the longitudinal and machine directions; and a second film bonded to the first film, and comprising a barrier layer.

In another aspect of the present invention, a method for providing a thermoformable composite film with reduced line draw comprises extruding a first polymeric film; orienting the first film to sub-stantially the same extent in both the longitudinal and transverse directions; extruding a second polymeric film comprising a barrier layer; and bonding the second film to the first film.

In another aspect of the present invention, a thermoplastic crystalline polyolefin film having a density less than about 0.935 grams Per cubic centimeter, useful in thermoforming operations, comprises a high molecular weight polyolefin material of fractional melt index, blown at least to a blow-up ratio sufficient to orient the film to substantially the same extent in both the longitudinal and machine directions.

In another aspect of the invention, a method for producing a thermoformable blown film with reduced line draw comprises extruding a film comprising a high molecular weight polyolefin material of fractional melt index, and hot blowing the film at least to a blow-up ratio sufficient to orient the film to substantially the same extent in both the longitudinal and machine directions.

DEFINITIONS

The term "composite" is used herein to refer to a film composed of two or more components, each component comprising a monolayer or multilayer film or laminate.

The terms "oriented", "orientation" and the like are used herein to describe the process and resultant product characteristics obtained by stretching a resinous orientable polymeric thermoplastic material which is heated to its orientation temperature range and then cooled in order to lock-in or freeze the molecular alignment of the material in the direction of stretching. This action improves the mechanical properties of the film, such as shrink tension and orientation release stress. Both of these properties may be measured in accordance with ASTM D 2838 69 (reapproved 1975). The orientation temperature range for a given film will vary with the different resinous thermoplastic materials or blends thereof which comprise the film. Generally, this temperature range is above room temperature and below the melting point of the thermoplastic material or blend of materials. Orientation temperature ranges for the materials encompassed by the present application are well known in the art. When stretching is applied in one direction uniaxial orientation results. When stretching is applied in two directions biaxial orientation results.

The term "crystalline" is used herein to refer to a polymeric material composed of molecular chains which are so constructed that they can pack together well in ordered arrangements. The term is used herein to describe polymers which are in the crystalline state when in film form. In practice, many of the thermoplastic polymeric materials referred to as crystalline, including those in the present application, are actually semi-crystalline in nature, with some amorphous regions of greater or lesser extent interspersed with more geometrically ordered crystalline regions sometimes referred to as spherulites.

The term "ethylene vinyl acetate copolymer" is used herein to describe thermoplastic polymers having principally ethylene comonomer with generally smaller amounts of vinyl acetate comonomer.

The term "linear low density polyethylene" "LLDPE", and the like are used herein to describe copolymers of ethylene with one or more comonomers selected from preferably $C_4$ to $C_{10}$ alpha olefins such as butene-1, octene, etc. in which the molecules of the copolymers comprise long chains with few side chain branches or cross-linked structures. This molecular structure is to be contrasted with conventional low or medium density polyethylenes which are more highly branched than their respective counterparts. LLDPE may also be characterized by the low pressure, low temperature processes used to produce these materials. LLDPE as defined herein has a density usually in the range of from about 0.916 grams/cubic centimeter to about 0.925 grams/cubic centimeter.

The term "polyolefin" is used herein to describe thermoplastic polymers derived from the various olefins such as polyethylene, polypropylene and the like, and also includes copolymers having olefinic comonomers combined with small amounts of unsaturated ester comonomers.

BRIEF DESCRIPTION OF THE DRAWINGS

Further details are given below with reference to the drawings wherein.

DESCRIPTION OF THE PREFERRED EMBODIMENTS

Figure 1:
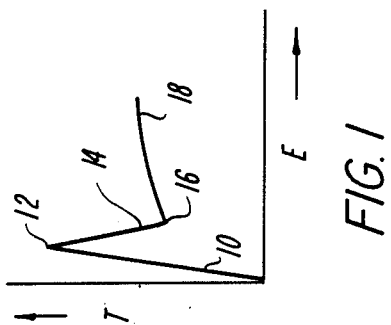
FIG. 1 is a graph of a tensile strength/elongation curve demonstrating the line draw phenomenon.

FIG. 1 of the drawings shows a tensile/elongation curve for a totally unoriented film, or a film substantially unoriented in one direction. The first leg or segment 10 of the curve represents the gradual elongation of the film material with increasing tensile strength or tensile stress. At a yield point 12, thinning of the film occurs as elongation continues with decreasing tensile strength. This property of the film is represented by component 14 of the curve. At transition point 16, elongation of the film continues with slight increase in tensile strength, as represented by segment 18 of the curve.

FIG. 1 graphically represents the undesirable line draw phenomenon described above. Ideally, behaviour of a melt oriented film, or solid oriented (i.e. stretch oriented) film, represented respectively by FIGS. 2 and 3, at segments 20 and 22 respectively, is sought in order to avoid line draw and provide a film suitable for example in thermoforming applications.

Line draw is believed to be a preferential stretching or elongation of amorphous sections of the thermoplastic crystalline material in between relatively crystalline sections marked by the presence of spherulites in the microstructure of the material.

It has been discovered that by using relatively high molecular weight thermoplastic crystalline materials in conjunction with relatively high blow-up ratios in a hot blown film, or by biaxially stretch orienting previously extruded and cooled and reheated material, line draw may be reduced or eliminated. At the same time, a film useful in thermoforming operations, especially shallow drawing operations, is obtained.

In accordance with the present invention, a film of either monolayer or multilayer construction may be hot blown from an extrusion die at a relatively high blow-up ratio. The thermoplastic material of the film construction should be crystalline in nature, and of relatively high molecular weight to maintain film integrity during the blow-up procedure. Polyolefin materials having a density less than about 0.935 grams per cubic centimeter are preferred. Thermoplastic materials with high molecular weight have the propensity to stretch sufficiently during the hot blowing process to provide balanced orientation in both the longitudinal (machine) and transverse directions.

High molecular weight materials can be characterized by melt flow index, and specifically by a fractional melt flow index, i.e. less than one (1) gram/ten minutes (ASTM D-1238).

Alternatively, thermoplastic crystalline materials may be stretch oriented to obtain a biaxially oriented film. In this second embodiment, a tubing is extruded and then cooled and reheated, and then stretched by e.g. the blown bubble process. This process is well known in the art. In the case of stretch oriented materials, the molecular weight of the thermoplastic resin is not a critical factor, because the tubing is being stretched and oriented at a relatively low temperature in comparison with the hot blown process described above.

Figure 2:
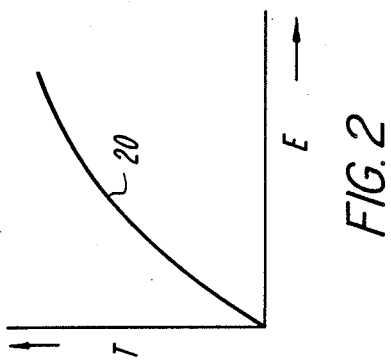
FIG. 2 is a graph of a tensile strength/elongation curve for a typical melt oriented material.
Figure 3:
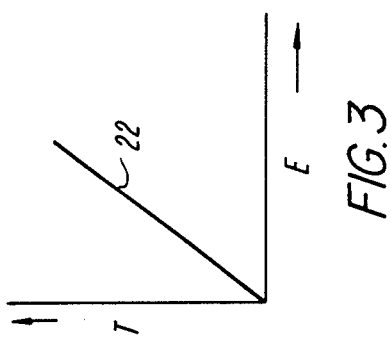
FIG. 3 is a graph of a tensile strength/elongation curve for a typical stretch oriented material.

Graphic representations of the tensile strength/elongation curve for melt oriented and stretch oriented thermoplastic films appear in FIGS. 2 and 3. Low or moderate, balanced orientation of these materials, either by the hot blown process in the case of relatively high molecular weight resins, or during stretch orienting, results in little or no yield point (compare FIG. 1) and little or no line draw.

Elongation occurs as a continuous, progressive result of increasing tensile strength. FIG. 2 shows a slight creep or progressive elongation, but in a uniform manner, in both the transverse and machine direction. FIG. 3 represents totally elastic elongation with increasing tensile strength in a cold drawn, stretch oriented film with biaxial orientation.

Figure 4:
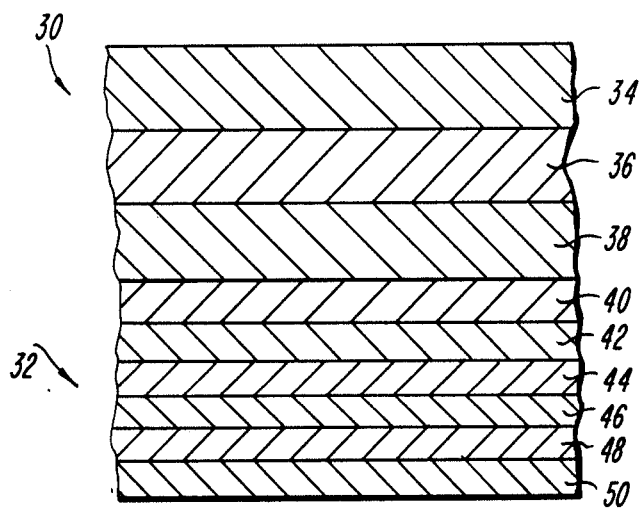
FIG. 4 is a schematic cross section of a preferred embodiment of a thermoplastic laminate of the invention.

Referring now to FIG. 4 of the drawings, a schematic cross section of a preferred embodiment of a thermoplastic composite film of the invention is shown. A first, oriented, coextruded film 30 is bonded, preferably by corona bonding to a second coextruded film 32.

In a preferred embodiment, the first, coextruded film has a thickness of about 1 mil and is coextruded and irradiated to between about 4 and 9 megarads. This first coextruded film has a maximum orientation of about 3.5:1 in both the transverse and longitudinal (machine) directions. A relatively low maximum orientation is believed to be necessary to provide for good shallow draw properties i.e. thermo-forming in which the formed web will make up a relatively low profile container or tray. A preferred coextruded film includes three plys or layers, the first layer 34 comprising ethylene vinyl acetate copolymer. This layer functions as a sealing layer in conjunction with a suitable non-forming web. The third or bonding layer 38 of this coextruded film is also ethylene vinyl acetate copolymer. This layer acts as a bonding layer, preferably to be corona bonded to the second coextruded film 32.

Intermediate the two ethylene vinyl acetate (EVA) layers is an intermediate layer 36 of linear low density polyethylene. This intermediate layer adds strength and toughness characteristics to the resulting laminate.

The second coextruded film 32 has a thickness of preferably about 1 mil and is produced by preferably a blown film process. In one preferred embodiment, second coextruded film 32 has a first or bonding layer 40 comprising an ethylene vinyl acetate copolymer. This layer bonds, preferably by corona bonding to layer 38 of first coextruded film 30.

A second layer 42 comprises linear low density polyethylene, which may be the same as that used in layer 36 of first coextruded film 30.

A third layer 44 and fifth layer 48 comprise ethylene vinyl acetate copolymer. Sandwiched between layers 44 and 48 is a barrier layer 46 of for example vinylidene chloride vinyl chloride copolymer (saran). Ethylene vinyl alcohol copolymer is also suitable as a barrier resin.

A sealant layer 50 comprises ethylene vinyl acetate copolymer.

Figure 5:
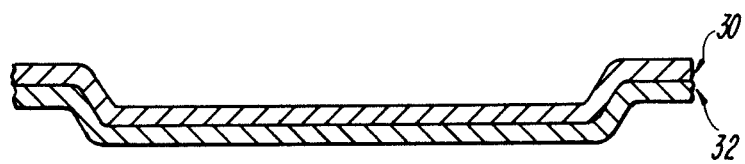
FIG. 5 is a schematic cross section of a shallow formed tray in accordance with the invention.

Referring to FIG. 5, a laminate such as that shown schematically in FIG. 4 is depicted in a shallow drawn thermoformed tray. First coextruded film 30 corona bonded to second coextruded film 32 forms the thermoforming laminate used as a forming web. Vertical dimensions are highly exaggerated for purposes of clarification.

To illustrate the importance of limited, balanced orientation in controlling line draw, reference is made to the following examples.

EXAMPLE 1

The physical properties of a cast ethylene vinyl acetate copolymer, with 4.5% vinyl acetate by weight and blended with a high density polyethylene (Alathon F-3445 from du Pont) were measured and recorded. This film was unirradiated with no blow up ratio. At 250° F., the percentage of free shrink in a transverse direction was minus 24% and in the longitudinal direction was 54%. The modulus in pounds per square inch was 20,500 psi in the transverse direction, and 18,800 in the longitudinal direction. Tensile strength at break, in pounds per square inch, was 2,360 psi in the transverse direction, and 3,320 psi in the longitudinal direction. Elongation at break was 799% in a transverse direction and 460% in the longitudinal direction. When the film was tested in a shallow thermoform operation, some line draw was evident.

EXAMPLE 2

A film of a cast ethylene vinyl acetate copolymer blended with a high density polyethlene, but irradiated with 6 megarads of radiation was similarly tested. This film also had no blow up ratio. At 250° F., the film exhibited minus 12 percent free shrink in the transverse direction, and 33 percent free shrink in the longitudinal direction. The modulus was 19,000 psi in the transverse direction and 18,100 psi in the longitudinal direction. Tensile strengths were 3,170 psi in the transverse direction and 3,770 in the longitudinal direction. At these temperatures, the elongation at break was 820 percent (transverse) and 450 percent (longitudinal). Some line draw occurred during subsequent thermoforming.

EXAMPLE 3

A film of an ethylene vinyl acetate copolymer blended with a high density polyethylene, irradiated with 6 megarads and having a blow up ratio of 3.7:1 showed a percentage free shrink of 8 percent transverse and 9 percent longitudinal at 250° F. Modulus was 28,600 psi (transverse) and 26,400 psi (longitudinal). Tensile strengths were 3,730 psi (transverse) and 3,300 psi (longitudinal). Corresponding elongation at break was 739 percent and 684 percent. This film showed no line draw. It should be noted that the film of example 3, having a blow-up ratio of 3.7:1, has less orientation than a film having a stretch orientation ratio of 3.5:1.

EXAMPLE 4

A film of an ethylene vinyl acetate copolymer blended with a high density polyethylene irradiated with 6 megarads but having a blow up ratio of 3:1 showed 5 percent (transverse) and 11 percent (longitudinal) free shrink at 250° F. Modulus was 30,900 and 27,700 psi in the transverse and longitudinal directions respectively. Tensile strengths were 3,490 psi and 3,600 psi; elongations were 711 percent and 662 percent in the transverse and longitudinal directions respectively. Line draw was evident in the thermoforming test.

EXAMPLE 5

A film of an ethylene vinyl acetate copolymer blended with a high density polyethylene irradiated with 6 megarads but with a blow up ratio of 2:1 was also tested at 250° F. In the transverse direction, a laminate had a percentage free shrink of minus one percent; in the longitudinal direction, a percentage of free shrink of about 17 percent. The modulus was 31,900 and 24,900 psi in the transverse and longitudinal directions respectively. Corresponding tensile strengths at the same temperature were 3,260 and 3,570 psi, with elongations of 774 percent and 596 percent respectively. Some line draw occurred during thermoforming.

The above examples indicate that limiting maximum orientation in both the transverse and longitudinal directions, and maintaining a balanced orientation i.e. roughly equivalent in both directions, results in improved modulus and tensile strength properties which are desirable in a laminate to be used in a thermoforming process to form a shallow draw forming web. Additionally, it was found that in actually producing such a forming web, the problem of line draw was substantially reduced or eliminated.

The amount of stretchability of a film will generally be inversely proportional to the degree of orientation. Therefore lower stretch orientation ratios, of not more than 3.5:1 orientation ratio in each direction, are especially suitable in low profile shallow draw thermoforming operations. These ratios may be lowered, i.e. the degree of orientation may be lessened to provide a more stretchable film for deeper thermoforming operations, but as the orientation ratios are lowered, line draw will become an increasing problem.

In the examples given above, the degree of orientation in each direction may be inferred from the percent of free shrink indicated in each example. Higher percentages of free shrink indicate higher orientation ratios.

Laminates of the present invention also exhibit excellent barrier properties, having an oxygen transmission rate at 73° F., 0 percent relative humidity of as little as 10 cubic centimeters per square meter (ASTM D 3985).

Values for tensile strength at break were determined in accordance with ASTM D 882-81. Similar testing methodology was used for determination of elongation at break and modulus.

Free shrink was measured in accordance with ASTM D 2732.

It should be understood that the description and specific examples indicating the presently preferred embodiments of this invention are given by way of illustration only. Various modifications and changes within the scope of the invention will become readily apparent to those of ordinary skill in the art upon review of the above detailed description and examples.

What is claimed is:

1. A thermoplastic composite film useful in thermoforming operations comprising:
   (a) a first oriented polymeric film oriented to substantially the same extent in both the longitudinal and transverse directions;
   (b) a second polymeric film bonded over most of a major surface to the first film, and comprising an oxygen barrier layer sufficient to protect packaged food products; and
   (c) wherein the first film has been oriented to a maximum orientation ratio of about 3.5:1 and the first polymeric film has been bonded to the second polymeric film after effecting biaxial orientation of the first polymeric film.

2. A thermoplastic composite film according to claim 1 wherein the barrier layer comprises a vinylidene chloride copolymer.

3. A thermoplastic composite film according to claim 1 wherein the barrier layer comprises an ethylene vinyl alcohol copolymer.

4. A thermoplastic composite film according to claim 1 wherein the second film has been bonded to the first film by corona bonding.

5. A thermoplastic composite film useful in thermoforming operations, comprising:
   (a) a first multilayer oriented polymeric film with substantially the same degree of orientation in both the longitudinal and transverse directions, and with a maximum orientation ratio of about 3.5:1 in both directions; and
   (b) a second multilayer polymeric film bonded over most of a major surface to the first film, and comprising an oxygen barrier layer sufficient to protect packaged food products, said second multilayer polymeric film having been bonded to said first multilayer polymeric film after effecting biaxial orientation of said first polymeric film.

6. A thermoplastic composite film according to claim 5 wherein the barrier layer comprises a vinylidene chloride copolymer.

7. A thermoplastic composite film according to claim 5 wherein the barrier layer comprises an ethylene vinyl alcohol copolymer.

8. A thermoplastic composite film according to claim 5 wherein the second film is bonded to the first film by corona bonding.

9. A thermoplastic composite film useful in shallow draw thermoforming operations, comprising:
   (a) a first irradiated multilayer oriented polymeric film with substantially the same degree of orientation in both the longitudinal and transverse directions, and with a maximum orientation ratio of about 3.5:1 in both directions; and
   (b) a second multilayer polymeric film bonded over most of a major surface to the first film, and comprising an oxygen barrier layer sufficient to protect packaged food products, said second multilayer polymeric film having been bonded to said first multilayer polymeric film after effecting biaxial orientation of said first polymeric film.

10. The film according to claim 9 wherein the first multilayer film is stretch oriented.

11. The film according to claim 9 wherein the first multilayer film comprises high molecular weight polymeric materials of fractional melt index, the film being melt oriented.

12. A thermoplastic composite film according to claim 9 wherein the second film is bonded to the first film by corona bonding.

13. A thermoplastic composite film according to claim 9 wherein the first film comprises:
   (a) a first or sealing layer comprising ethylene vinyl acetate copolymer;
   (b) a second layer comprising linear low density polyethylene, and
   (c) a third or bonding layer comprising ethylene vinyl acetate copolymer.

14. A thermoplastic composite film according to claim 9 wherein the second film comprises:
   (a) a first or bonding layer comprising an ethylene vinyl acetate copolymer;
   (b) a second layer comprising a linear low density polyethylene;
   (c) a third layer comprising ethylene vinyl acetate;
   (d) a fourth or barrier layer comprising an oxygen barrier polymeric material;
   (e) a fifth layer comprising an ethylene vinyl acetate copolymer; and (f) a sixth or sealant layer comprising a polymeric material selected from the group consisting of ethylene vinyl acetate copolymer and ionomer.

15. A thermoplastic composite film according to claim 14 wherein the oxygen barrier polymeric material comprises a vinylidene chloride copolymer.

16. A thermoplastic composite film according to claim 14 wherein the oxygen barrier polymeric material comprises an ethylene vinyl alcohol copolymer.

17. A thermoplastic composite film according to claim 14 wherein the first film has been irradiated to from about 4 to about 9 megarads of irradiation.

* * * * *

UNITED STATES PATENT AND TRADEMARK OFFICE
CERTIFICATE OF CORRECTION

PATENT NO. : 4,940,634

DATED : July 10, 1990

INVENTOR(S) : Walter B. Mueller and Henry G. Schirmer

It is certified that error appears in the above-identified patent and that said Letters Patent is hereby corrected as shown below:

Title page, line 3 of the Abstract, delete "machine" substituting therefor --transverse--.

On page 1, line 7 of the Abstract, delete "machine" substituting therefor --transverse--.

In column 2, line 32 of the Summary of the Invention, delete "machine" substituting therefor --transverse--.

In column 2, line 49 of the Summary of the Invention, delete "machine" substituting therefor --transverse--.

In column 2, line 56 of the Summary of the Invention, delete "machine" substituting therefor --transverse--.

Signed and Sealed this

Twenty-first Day of April, 1992

Attest:

HARRY F. MANBECK, JR.

*Attesting Officer*     *Commissioner of Patents and Trademarks*